(12) United States Patent
Petrovici et al.

(10) Patent No.: US 11,080,695 B2
(45) Date of Patent: Aug. 3, 2021

(54) FRAUD PREVENTION TRADING AND PAYMENT SYSTEM FOR BUSINESS AND CONSUMER TRANSACTIONS

(76) Inventors: Gabriel Johann Petrovici, Cologne (DE); Michelle Anna Roller, Cologne (DE)

(*) Notice: Subject to any disclaimer, the term of this patent is extended or adjusted under 35 U.S.C. 154(b) by 433 days.

(21) Appl. No.: 13/478,087

(22) Filed: May 22, 2012

(65) Prior Publication Data
US 2012/0265638 A1   Oct. 18, 2012

Related U.S. Application Data

(63) Continuation-in-part of application No. 12/846,844, filed on Jul. 30, 2010, now abandoned.

(60) Provisional application No. 61/229,992, filed on Jul. 30, 2009.

(51) Int. Cl.
*G06Q 20/38* (2012.01)
*G06Q 20/18* (2012.01)
*G06Q 30/06* (2012.01)

(52) U.S. Cl.
CPC ........... *G06Q 20/385* (2013.01); *G06Q 20/18* (2013.01); *G06Q 30/06* (2013.01)

(58) Field of Classification Search
CPC . G06Q 20/382; G06Q 20/3821; G06Q 20/385
See application file for complete search history.

(56) References Cited

U.S. PATENT DOCUMENTS

| | | | |
|---|---|---|---|
| 2002/0112171 A1* | 8/2002 | Ginter et al. | 713/185 |
| 2007/0125840 A1* | 6/2007 | Law et al. | 235/379 |
| 2008/0288395 A1* | 11/2008 | Srinivasan et al. | 705/39 |
| 2010/0005302 A1* | 1/2010 | Vishnu et al. | 713/171 |

* cited by examiner

*Primary Examiner* — Jay Huang
(74) *Attorney, Agent, or Firm* — Cygnet IP Law, P.A.; Stephen W. Aycock, II

(57) ABSTRACT

A code system for preventing fraud in trading and at the same time a safe payment method for business and consumer. The code system of the present invention ensures security and control for the contracting parties regarding the previously defined attributes of the goods and the payment including all decisional steps of the transactions as well as of the reverse transactions in case of complaint. The contracting parties act complementary, money and goods or money and services are never at the same time under control of one contracting party.

6 Claims, 2 Drawing Sheets

FRAUD PREVENTION TRADING AND PAYMENT SYSTEM FOR BUSINESS AND CONSUMER TRANSACTIONS

RELATED APPLICATIONS

This application is a continuation-in-part of application Ser. No. 12/846,844, entitled "Fraud Prevention Trading and Payment System for Business and Consumer", filed on Jul. 30, 2010, which claims the benefit of U.S. Provisional Patent Application No. 61/229,992, entitled "Time- and place related trade- and interests linking search- and auction system on the internet (world wide web)", filed Jul. 30, 2009, which is incorporated herein by reference in its entirety.

FIELD

Embodiments are related to fraud prevention trading and payment systems for businesses and consumers and can include a system for handling a contract between two or more contracting parties from the beginning to the conclusion of the contract including the safe handling of payments. Embodiments can be used for fraud prevention in business to business (B2B), consumer to consumer (C2C), and to business to consumer (B2C) transactions.

BACKGROUND

At the time being there exist business to business internet platforms and consumer to consumer internet platforms as well as business to consumer platforms. Many of the B2B internet platforms establish contacts between businesses, the transaction does not necessarily take place on the internet platform, that offers the possibility to contact other businesses. Other B2B, C2B and C2C internet platforms have the possibility of closing a deal and paying on the same internet platform. Different payment systems can be used, as outlined below.

In import/export letter of credit is a frequently used method of payment. The advantage is a high security standard, on the other hand there are high costs for the banks services for the contracting parties because of the high bureaucracy and usually quite a long duration of the whole settlement.

Another payment situation is represented by payment on account, in this case bank wire transfer or direct debit, also by online banking are frequently used payment methods in the domestic and also in the international market. Other payment possibilities are represented by credit card, debit card, e-wallet payment methods, any prepaid payment methods and money transfer with immediate cash payout systems. The buying party is clearly in advantage compared to the vendor, because it receives first the goods or services, can verify the quality and pay afterwards. The vendor party takes the risk of cash loss in case of fraud or insolvency.

Cash on delivery is a special case, because it does not give the buyer the possibility to verify the content and the quality of the goods he receives, since he has to pay on the spot even before opening the package.

One more payment situation is the payment in advance, in which all the payment systems that are also used for payment on account, like above mentioned, can be used. Clearly the advantage is in the case of payment in advance on the vendor's side, the buyer has the risk of cash loss in case of fraud or the risk that the goods or services he buys are not corresponding to the description given by the vendor.

All the above payment methods have in common that they can guarantee secure payment. Except for the letter of credit none of the above mentioned payment systems may be able to prevent fraud for both contracting parties or to solve the problem of insolvency. As far as the letter of credit is concerned, the control during the transaction is entirely in the hands of the banks of the two or more contracting parties, if any objection regarding the quality of the contracted goods occurs, there is no possibility for the contracting parties to take any action. The inventors have developed the present invention which overcomes the drawbacks of the existing payment systems, the "fraud prevention trading and payment system for business and consumer" solves all these problems. By using our invention none of the contracting parties has at the same time control over money and goods or over money and services. These embodiments, and others described in greater detail herein, give the contracting parties the possibility of following and control a contract step by step until the conclusion and pay-out in absolute security in every decisional situation without becoming a victim of fraud, insolvency or similar inconvenient cases. Other features and advantages of the present invention will become apparent to those skilled in the art from the following detailed description.

SUMMARY

A transaction may be bad for a vendor, if a buyer is a defrauder or insolvent and may be bad for a buyer, if the buyer pays the vendor, but the goods or services do not correspond to the description of the contracted goods or services. Accordingly, embodiments of the fraud prevention trading and payment systems for business and consumer described herein can be useful for everybody who wants to sell or buy goods or services. It is a non bureaucratic system that allows security and control for the contracting parties over the quality of the goods and the payment by freezing the complete purchase price on the buyers account and a deposit on the vendors account. The contracting parties keep control over every decisional step of the transaction. In case of a complaint, reverse transactions are possible.

DETAILED DESCRIPTION

One embodiment includes a system having a computer or electronic terminal. The system is able to interact with a bank and contracting parties (two or more). All contracting parties have their respective accounts at a same e-wallet firm or respective bank accounts at the same bank and a trading platform is combined with the bank or e-wallet firm.

The system of the present invention can be implemented on any existing or future terminal or device with the processing capability to perform the functions described herein. It will be appreciated that an embodiment is not limited by the type of terminal or device used. Further, reference to a single click of a mouse as a means for user input and interaction with the terminal display is an example of a single action of the user for illustration purposes.

While this describes one mode of interaction, an embodiment is not limited to the use of a mouse as the input device or to the click of a mouse button as the user's single action. Rather, any action by a user regarding one transaction (code/deal), whether comprising one or more clicks of a mouse button, the input of a code or other input device, can be considered a single action of the user for the purposes of an embodiment.

The system can be applied to two or more matching codes. Only when the specific transaction is confirmed by the designated number of persons by input of components of the code or by mouse clicks, the transaction is completed. Further details will be explained below in conjunction with the flow chart shown in FIG. 1.

Further details of the invention will be explained with the flow chart shown in FIG. 1. In the example methods described below, it is assumed that buyers and sellers have accounts at a financial institution or e-wallet connected to the computer implemented system as described herein.

Figure 1:
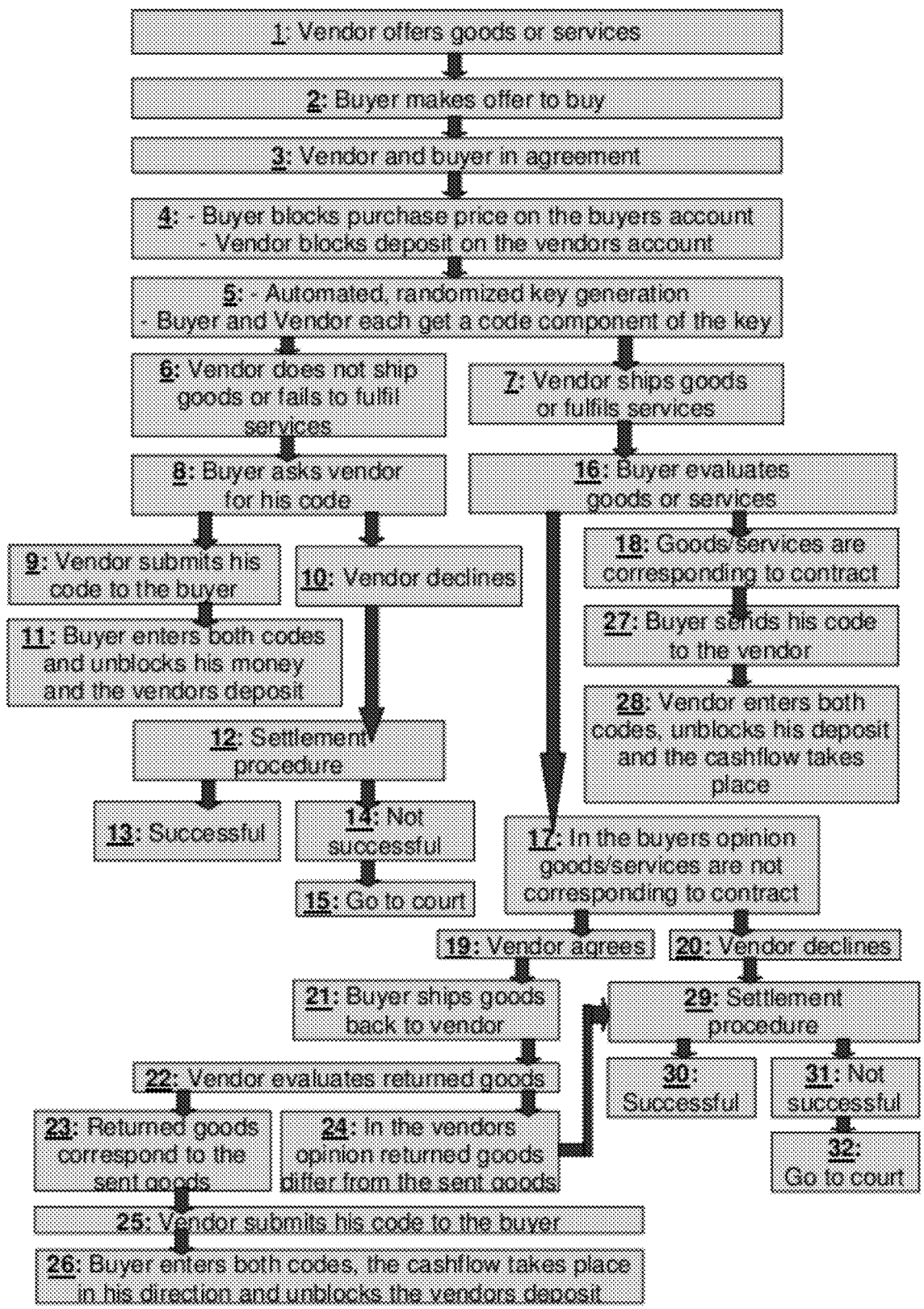
FIG. 1 shows a flowchart of a method in accordance with at least one embodiment.

According to FIG. 1 there are different alternative methods (or usage scenarios) using an embodiment:

Method 1
Step 1: Vendor offers goods or services to the buyer
Step 2: Buyer makes an offer to the vendor
Step 3: Vendor and buyer agree on price and conditions of the goods or services
Step 4: By agreeing the buyer blocks the purchase price on his account and the vendor blocks a certain deposit on his account
Step 5: The system generates automatically and randomized a key.
The key is split, buyer and vendor get each a code component of the key.
Step 6: Vendor does not ship goods or fails to fulfill services
Step 8: Buyer asks vendor for his code
Step 9: Vendor submits his code to the buyer
Step 11: Buyer enters both codes and unblocks his money and the vendor's deposit Method 2
Step 1: Vendor offers goods or services to the buyer
Step 2: Buyer makes an offer to the vendor
Step 3: Vendor and buyer agree on price and conditions of the goods or services
Step 4: By agreeing the buyer blocks the purchase price on his account and the vendor blocks a certain deposit on his account
Step 5: The system generates automatically and randomized a key.
The key is split, buyer and vendor get each a code component of the key.
Step 6: Vendor does not ship goods or fails to fulfill services
Step 8: Buyer asks vendor for his code
Step 10: Vendor declines to give his code to the buyer
Step 12: A settlement procedure is the attempt to find a solution to the difference of opinions
Step 13: The settlement procedure is successful Method 3
Step 1: Vendor offers goods or services to the buyer
Step 2: Buyer makes an offer to the vendor
Step 3: Vendor and buyer agree on price and conditions of the goods or services
Step 4: By agreeing the buyer blocks the purchase price on his account and the vendor blocks a certain deposit on his account
Step 5: The system generates automatically and randomized a key.
The key is split, buyer and vendor get each a code component of the key.
Step 6: Vendor does not ship goods or fails to fulfill services
Step 8: Buyer asks vendor for his code
Step 10: Vendor declines to give his code to the buyer
Step 12: A settlement procedure is the attempt to find a solution to the difference of opinions
Step 14: The settlement procedure is not successful
Step 15: The contracting parties go to court in order to obtain a decision on who is right Method 4
Step 1: Vendor offers goods or services to the buyer
Step 2: Buyer makes an offer to the vendor
Step 3: Vendor and buyer agree on price and conditions of the goods or services
Step 4: By agreeing the buyer blocks the purchase price on his account and the vendor blocks a certain deposit on his account
Step 5: The system generates automatically and randomized a key.
The key is split, buyer and vendor get each a code component of the key.
Step 7: Vendor ships goods to buyer or fulfills the services
Step 16: Buyer evaluates goods or services
Step 18: Goods or services are corresponding to contracted
Step 27: Buyer sends his code to the vendor
Step 28: Vendor enters both codes, unblocks his deposit and the cashflow takes place in his direction Method 5
Step 1: Vendor offers goods or services to the buyer
Step 2: Buyer makes an offer to the vendor
Step 3: Vendor and buyer agree on price and conditions of the goods or services
Step 4: By agreeing the buyer blocks the purchase price on his account and the vendor blocks a certain deposit on his account
Step 5: The system generates automatically and randomized a key.
The key is split, buyer and vendor get each a code component of the key.
Step 7: Vendor ships goods to buyer or fulfills the services
Step 16: Buyer evaluates goods or services
Step 17: In the buyers opinion goods or services are not corresponding to contract
Step 19: Vendor agrees with the buyer
Step 21: Buyer ships goods back to vendor
Step 22: Vendor evaluates the returned goods
Step 23: The returned goods correspond to the sent goods
Step 25: Vendor submits his code to the buyer
Step 26: Buyer enters both codes, the cashflow takes place in his direction and unblocks the vendors deposit Method 6
Step 1: Vendor offers goods or services to the buyer
Step 2: Buyer makes an offer to the vendor
Step 3: Vendor and buyer agree on price and conditions of the goods or services
Step 4: By agreeing the buyer blocks the purchase price on his account and the vendor blocks a certain deposit on his account
Step 5: The system generates automatically and randomized a key.
The key is split, buyer and vendor get each a code component of the key.
Step 7: Vendor ships goods to buyer or fulfills the services
Step 16: Buyer evaluates goods or services
Step 17: In the buyers opinion goods or services are not corresponding to contract
Step 19: Vendor agrees with the buyer
Step 21: Buyer ships goods back to vendor
Step 22: Vendor evaluates the returned goods Step 24: In the vendors opinion returned goods differ from the sent goods
Step 29: A settlement procedure is the attempt to find a solution to the difference of opinions
Step 31: The settlement procedure is not successful
Step 32: The contracting parties go to court in order to obtain a decision on who is right
Method 7
Step 1: Vendor offers goods or services to the buyer
Step 2: Buyer makes an offer to the vendor
Step 3: Vendor and buyer agree on price and conditions of the goods or services
Step 4: By agreeing the buyer blocks the purchase price on his account and the vendor blocks a certain deposit on his account
Step 5: The system generates automatically and randomized a key.
The key is split, buyer and vendor get each a code component of the key.
Step 7: Vendor ships goods to buyer or fulfills the services
Step 16: Buyer evaluates goods or services
Step 17: In the buyers opinion goods or services are not corresponding to contract
Step 19: Vendor agrees with the buyer
Step 21: Buyer ships goods back to vendor
Step 22: Vendor evaluates the returned goods
Step 24: In the vendors opinion returned goods differ from the sent goods
Step 29: A settlement procedure is the attempt to find a solution to the difference of opinions
Step 30: The contracting parties go to court in order to obtain a decision on who is right
Method 8
Step 1: Vendor offers goods or services to the buyer
Step 2: Buyer makes an offer to the vendor
Step 3: Vendor and buyer agree on price and conditions of the goods or services
Step 4: By agreeing the buyer blocks the purchase price on his account and the vendor blocks a certain deposit on his account
Step 5: The system generates automatically and randomized a key.
The key is split, buyer and vendor get each a code component of the key.
Step 7: Vendor ships goods to buyer or fulfills the services
Step 16: Buyer evaluates goods or services
Step 17: In the buyers opinion goods or services are not corresponding to contract
Step 20: Vendor declines
Step 29: A settlement procedure is the attempt to find a solution to the difference of opinions
Step 30: The settlement procedure is successful
Method 9
Step 1: Vendor offers goods or services to the buyer
Step 2: Buyer makes an offer to the vendor
Step 3: Vendor and buyer agree on price and conditions of the goods or services
Step 4: By agreeing the buyer blocks the purchase price on his account and the vendor blocks a certain deposit on his account
Step 5: The system generates automatically and randomized a key.
The key is split, buyer and vendor get each a code component of the key.
Step 7: Vendor ships goods to buyer or fulfills the services
Step 16: Buyer evaluates goods or services
Step 17: In the buyers opinion goods or services are not corresponding to contract
Step 20: Vendor declines
Step 29: A settlement procedure is the attempt to find a solution to the difference of opinions
Step 31: The settlement procedure is not successful
Step 32: The contracting parties go to court in order to obtain a decision.

Figure 2:
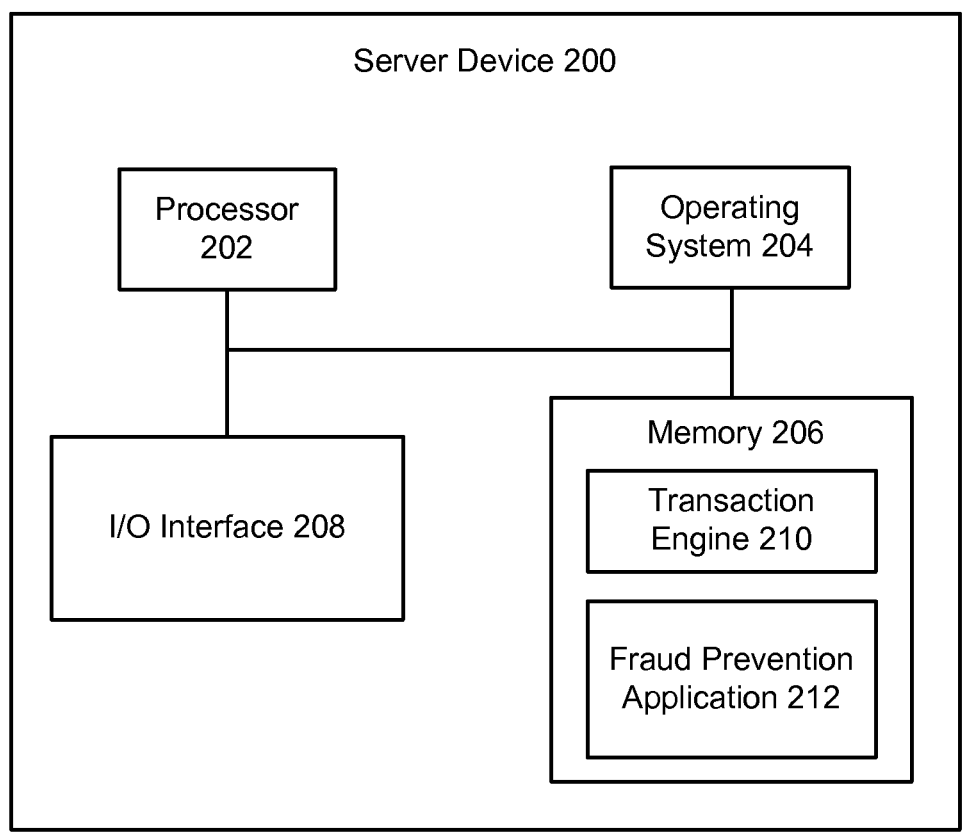
FIG. 2 is a diagram of a system in accordance with at least one embodiment.

FIG. 2 is a diagram of an example server device 200 that can be used for fraud prevention in accordance with at least one embodiment. The server device 200 includes a processor 202, operating system 204, memory 206 and I/O interface 208. The memory 206 can include a transaction engine 210 and an application program for fraud prevention 212.

In operation, the processor 202 may execute the application 212 stored in the memory 206. The application 212 can include software instructions that, when executed by the processor, cause the processor to perform operations for fraud prevention in accordance with the present disclosure (e.g., performing one or more of steps described above).

The application program 212 can operate in conjunction with the transaction engine 210 and the operating system 204.

The server (e.g., 200) can include, but is not limited to, a single processor system, a multi-processor system (co-located or distributed), a cloud computing system, or a combination of the above.

The client device can include, but is not limited to, a desktop computer, a laptop computer, a portable computer, a tablet computing device, a smartphone, a feature phone, a personal digital assistant, a media player, an electronic book reader, an entertainment system of a vehicle or the like.

The network can be a wired or wireless network, and can include, but is not limited to, a WiFi network, a local area network, a wide area network, the Internet, or a combination of the above.

The data storage, memory and/or computer readable medium can be a magnetic storage device (hard disk drive or the like), optical storage device (CD, DVD or the like), electronic storage device (RAM, ROM, flash, or the like). The software instructions can also be contained in, and provided as, an electronic signal.

Moreover, embodiments of the disclosed method, system, and computer readable media can be implemented in software executed on a programmed general purpose computer, a special purpose computer, a microprocessor, or the like.

It is, therefore, apparent that there is provided, in accordance with the various embodiments disclosed herein, systems, methods and computer readable media for fraud prevention.

While the invention has been described in conjunction with a number of embodiments, it is evident that many alternatives, modifications and variations would be or are apparent to those of ordinary skill in the applicable arts. Accordingly, Applicants intend to embrace all such alternatives, modifications, equivalents and variations that are within the spirit and scope of the invention.

APPENDIX A

Example Code Listing

```
// charges, advanced auction description, shipping selection and
// direct pay option omitted due to missing logical relevance
// frozen money gets automatically paid out to the (new) owner when
// the seller and the buyer go along with each other or when someone
// times out, that could be also executed by some action of the
```

APPENDIX A-continued

Example Code Listing

```
// (new) owner
BidPercentage = 1.0;
if(Page == "AuctionInsertion")
{
    if(CurrentUser != Guest)
    {
        Inserted = false;
        if(WasButtonPressed("Insert"))
        {
            if(AtleastAllMandantoryFieldsFilledOut)
            {
                // Input. Duration means the number of days until
                // auction times out
                // Input.Freeze Percentage lets the seller specify
                // how much he wants to freeze: lets him appear
                // trustworthy
                ToBeFreezed = (Input.StartPrice/100.0)*
                    Input.FreezePercentage;
                if(CurrentUser.Money >= ToBeFreezed)
                {
                    // Create new auction
                    Auction = new Auction;
                    Auction.Mode = "AuctionRunning";
                    Auction.Seller = CurrentUser;
                    Auction.Seller.Money -= ToBeFreezed;
                    Auction.SellerFrozen = ToBeFreezed;
                    Auction.StartPrice = Input.StartPrice;
                    Auction.StartTime = TimeStamp( );
                    Auction.Duration = Input.Duration;
                    Inserted = true;
                    // if we want a pair of codes (generating them
                    // just before they can be used proposed)
                    Auction.SellerCode = GenerateCode( );
                    Auction.BuyerCode = GenerateCode( );
                }
            }
        }
        if(!Inserted)
        {
            // StartPrice has to be minimum 1
            ShowNumberInput("StartPrice");
            // FreezePercentage has to be minimum 1 and maximum
            100
            ShowNumberInput("FreezePercentage");
            // Duration has to be minimum 1
            ShowNumberInput("Duration");
        }
    }
}
else if(Page == "SingleAuctionOverview")
{
    if(Auction.Mode == "AuctionRunning")
    {
        if(WasButtonPressed("Bid") &&
            (CurrentUser != Guest && CurrentUser != Auction.Seller))
        {
            if(AtleastAllMandantoryFieldsFilledOut)
            {
                // Auction.Buyer is the one with the best bid
                // as long as there is at least one bid
                // CurrentPrice is the best bid amount if there
                // is one otherwise just check against StartPrice
                // Whether the bid amount is high enough
                if((!Auction.Buyer &&
                    Input.BuyPrice > Auction.StartPrice)
                    || Input.BuyPrice > Auction.CurrentPrice)
                {
                    ToBeFreezed = (Input.BuyPrice/100.0)*
                        BidPercentage;
                    if(CurrentUser.Money >= ToBeFreezed)
                    {
                        // If someone bid before he gets his
                        // money back
                        if(Auction.Buyer)
                        {
                            Auction.Buyer.Money +=
                                Auction.BuyerFreezedAmount;
                        }
                        Auction.Buyer = CurrentUser;
                        Auction.CurrentPrice = Input.BuyPrice;
                        Auction.Buyer.Money -= ToBeFreezed;
                    }
                }
            }
        }
        // possibility to bid if you are not the highest bidder
        if(Auction.Buyer != CurrentUser)
        {
            // BuyPrice of minimum StartPrice or higher than
            // CurrentPrice when there was a bidder before
            ShowNumberField("BuyPrice");
            ShowButton("Bid");
        }
    }
    else if(Auction.Mode == "AuctionBuyerFound")
    {
        if(WasButtonPressed("BuyerCompletesMoneyFreezingProcess"))
        {
            if(CurrentUser == Auction.Buyer)
            {
                // Freeze remaining money of bid price
                Remaining = Auction.CurrentPrice -
                    ((Auction.CurrentPrice/100.0)*BidPercentage);
                if(Auction.Buyer.Money >= Remaining)
                {
                    Auction.Buyer.Money -= Remaining;
                    Auction.State = "BuyerFrozeMoney";
                }
            }
        }
        else if(WasButtonPressed("SellerStatesShipping"))
        {
            if(CurrentUser == Auction.Seller)
            {
                AutionState = "SellerStatedShipping";
            }
        }
        else if(WasButtonPressed("BuyerConfirmsGoods"+
            "TrueToDescription"))
        {
            if(CurrentUser == Auction.Buyer)
            {
                // Give seller his frozen money back and also
                // the buyers bid price
                Auction.Seller.Money += Auction.SellerFrozen +
                    Auction.CurrentPrice;
                Auction.State = "AuctionDone";
            }
        }
        else if(WasButtonPressed("BuyerClaimsAnnulationBecauseOf"+
            "GoodsDifferingFromDescriptionAndStatesShippingBack"))
        {
            if(CurrentUser == Auction.Buyer)
            {
                Auction.State = "BuyerClaimedAnnulationBecauseOf"+
                    "GoodsDifferingFromDescriptionAndStatedShippingBack";
            }
        }
        else if(WasButtonPressed("SellerConfirmsGoodsAreShippedBack"+
            "AsTheyWereBeforeAndAcceptsAnnulation"))
        {
            if(CurrentUser == Auction.Seller)
            {
                // Liquify each ones assets
                Auction.Seller.Money += Auction.SellerFrozen;
                Auction.Buyer.Money += Auction.CurrentPrice;
                Auction.State = "AuctionDone";
            }
        }
        // Codes are not necessary, but if they are used we need
        // a way to pay them out
        // Paying out a pair of codes is also possible outside the
        // auction overview by iterating through the auctions
        // and check their codes (you could fix the paying out
        // process to just a few people but atleast the seller and
        // the buyer)
```

APPENDIX A-continued

Example Code Listing

```
else if((Input.Code1 == Auction.SellerCode &&
    Input.Code2 == Auction.BuyerCode) ||
    (Input.Code1 == Auction.BuyerCode &&
    Input.Code2 == Auction.SellerCode))
{
    if(CurrentUser == Auction.Seller)
    {
        // Give seller his frozen money back and also
        // the buyers bid price
        Auction.Seller.Money += Auction.SellerFrozen +
            Auction.CurrentPrice;
        Auction.State = "AuctionDone";
    }
    else if(CurrentUser == Auction.Buyer)
    {
        // Liquify each ones assets
        Auction.Seller.Money += Auction.SellerFrozen;
        Auction.Buyer.Money += Auction.CurrentPrice;
        Auction.State = "AuctionDone";
    }
}
if(Auction.State == "NothingDoneSoFar")
{
if(CurrentUser == Auction.Buyer)
{
    ShowButton("BuyerCompletesMoneyFreezingProcess");
}
}
else if(Auction.State == "BuyerFrozeMoney")
{
    if(CurrentUser == Auction.Seller)
    {
        ShowButton("SellerStatesShipping");
    }
}
else if(Auction.State == "SellerStatedShipping")
{
    if(CurrentUser == Auction.Buyer)
    {
        ShowButton("BuyerConfirmsGoodsTrueToDescription");
        ShowButton("BuyerClaimsAnnulationBecauseOfGoods"+
            "DifferingFromDescriptionAndStatesShippingBack");
    }
}
else if(Auction.State == "BuyerClaimedAnnulationBecauseOf"+
    "GoodsDifferingFromDescriptionAndStatedShippingBack")
{
    if(CurrentUser == Auction.Seller)
    {
        ShowButton("SellerConfirmsGoodsAreShippedBack"+
            "AsTheyWereBeforeAndAcceptsAnnulation");
        ShowButton("SellerConfirmsGoodsAreShippedBack"+
            "AsTheyWereBeforeButDoesNotAcceptAnnulation");
    }
}
    // Display codes
    if(Auction.State != "AuctionDone")
    {
        if(Groundswell == Auction.Seller)
        {
            ShowCode(Auction.SellerCode);
        }
        else if(CurrentUser == Auction.Buyer)
        {
            ShowCode(Auction.BuyerCode);
        }
    }
}
// Timeout handling
// Auction runs out of time
if(TimeStamp( ) > Auction.StartTime+(Auction.Days*60*60*24))
{
    if(!Auction.Buyer)
    {
        Auction.Seller.Money += Auction.SellerFrozen;
        AuctionMode = "AuctionDone";
    }
```

APPENDIX A-continued

Example Code Listing

```
    else
    {
        AuctionMode = "AuctionBuyerFound";
    }
}
else if(SellerTimesOutOnCriticalAuctionMode)
{
    OnePercent = (Auction.StartPrice/100.0)*1.0;
    Remaining = Auction.SellerFrozen−OnePercent;
    Auction.Seller.Money += Remaining;
    Auction.Buyer.Money += Auction.CurrentPrice+OnePercent;
    Auction.Mode = "AuctionDone";
}
else if(BuyerTimeOutOnCriticalAuctionMode)
{
    Auction.Seller.Money += Auction.SellerFrozen+
        ((Auction.CurrentPrice/100)*BidPercentage);
    Auction.Mode = "AuctionDone";
}
```

What is claimed is:

1. A system comprising:

a computer coupled to a network for carrying data, the computer having at least one central processing unit;

a memory coupled to the computer and adapted to store a database;

a server corresponding to a host and operably connected to the network to host data corresponding to online transactions, including a buyer account and a seller account;

one or more input/output communication terminals coupled to the network and configured to transmit and receive codes associated with the buyer account and the seller account at a financial institution, wherein the memory coupled to the computer has software instructions stored therein that, when executed by the at least one central processing unit, cause the at least one central processing unit to perform operations including:

randomly generating a directional electronic funds transfer key having a variable number of bits divided into two parts of variable length, a first part associated with a seller and forming a seller code and a second part associated with a buyer and forming a buyer code;

storing the directional electronic funds transfer key including the first part and the second part in the memory;

electronically transmitting the seller code of the directional electronic funds transfer key to the seller and the buyer code of the directional electronic funds transfer key to the buyer;

blocking a sum related to a specific transaction on the buyer account and a certain variable percentage of the sum as a deposit on the seller account when contracted by the seller and the buyer conjointly until the specific transaction is concluded;

when the buyer accepts goods or services provided by the seller:

electronically transmitting the buyer code of the directional electronic funds transfer key from the buyer to the seller;

determining that the seller has electronically provided the directional electronic funds transfer key including both the seller code and the buyer code;

in response to determining that the seller has electronically input the directional electronic funds transfer key, electronically transferring the sum to the seller account and electronically unblocking the certain variable percentage of the sum;

when the buyer does not accept the goods or services provided by the seller:
- returning the goods to the seller when goods were provided;
- receiving seller confirmation that the returned goods correspond to the shipped goods;
- electronically transmitting the seller code of the directional electronic funds transfer key from the seller to the buyer;
- determining that the buyer has electronically input the directional electronic funds transfer key including both the seller code and the buyer code;
- in response to determining that the buyer has electronically input the directional electronic funds transfer key, electronically unblocking the sum and transferring the certain variable percentage of the sum to the buyer account when the seller does not deliver the goods or services:
- requesting the seller code be transmitted from the seller to the buyer;
- electronically transmitting the seller code of the directional electronic funds transfer key from the seller to the buyer;
- determining that the buyer has electronically input the directional electronic funds transfer key including both the seller code and the buyer code; and
- in response to determining that the buyer has electronically input the directional electronic funds transfer key, electronically unblocking the sum and transferring the certain variable percentage of the sum to the buyer account.

2. The system of claim 1, wherein the system is further configured to maintain a reserve on funds in a buyer or seller account respectively so that in case of a complaint the funds remain reserved on the respective accounts.

3. The system of claim 1, wherein the system is further configured to automatically transmit the seller code when the buyer and the seller confirm and not transmit the seller code if a party does not confirm.

4. The system of claim 1, wherein the buyer and the seller include a plurality of vendors and a plurality of buyers.

5. The system of claim 1, wherein the system is further configured to:
- instantly transfer money in a pay-out process, whereby a money sender creates a key and the system transmits automatically a part of the key to a money recipient,
- wherein after receiving the part of the key, the money recipient presents himself at a pay-out communication terminal connected to the system or uses an automated teller machine (ATM) having access to a storage containing the key, and
- wherein after the input of the part of the key in the communication terminal, cash out takes place and the money can be paid out to the money recipient even when the money recipient has no bank account.

6. The system of claim 5, wherein the system is configured to permit a user to create a key and configured to permit use of a code component in a pay-out process or for a cashless payment and for receiving change, when a sum due is less than a sum of the cashless payment paid for the sum due.

* * * * *